United States Patent [19]
Brewer

[11] 3,921,581
[45] Nov. 25, 1975

[54] FRAGRANT ANIMAL LITTER AND ADDITIVES THEREFOR

[75] Inventor: Andrew I. Brewer, Long Beach, Calif.

[73] Assignee: Star-Kist Foods, Inc., Terminal Island, Calif.

[22] Filed: Aug. 1, 1974

[21] Appl. No.: 493,518

[52] U.S. Cl. ................................... 119/1
[51] Int. Cl.² ................................. A01K 29/00
[58] Field of Search ........................... 119/1

[56] References Cited
UNITED STATES PATENTS

| | | | |
|---|---|---|---|
| 2,708,418 | 5/1955 | Sugarman et al. | 119/1 |
| 3,059,615 | 10/1962 | Kuceski et al. | 119/1 |
| 3,286,691 | 11/1966 | McFadden | 119/1 |
| 3,675,625 | 7/1972 | Miller et al. | 119/1 |

*Primary Examiner*—Hugh R. Chamblee
*Attorney, Agent, or Firm*—Fulwider, Patton, Rieber, Lee & Utecht

[57] ABSTRACT

There is disclosed a composition suitable for use as a pet litter additive which is moisture sensitive to release a fragrance. The composition is in the form of consolidated particles of a perfume agent and a solid excipient of molded, finely subdivided powder as a carrier therefor and including a binder and water-sensitive disentegrant sufficient to maintain the particles in a consolidated or molded shape during handling, storage and use thereof and sufficient, when contacted with water or urine to disentegrate said particles and release said fragrance. The perfume can be any suitable fragrance-releasing-agent and can be in the form of a water-soluble fragrance of any suitable scent. Preferably plant fragrances are employed such as scents of roses, lilacs, pine etc. The solid excipient includes a finely subdivided or powdered carrier which, preferably, has a powder size passing a twenty mesh standard size sieve. Suitable solid materials which can be employed include cellulosic materials such as finely ground hay, husks, sawdust, excelsior, cereal hulls, corncobs, etc., or chlorophyll-containing-agents such as ground grasses, ground alfalfa and the like. The finely subdivided solid can also be mineral and suitable minerals include alumino-silicates, such as clays, e.g., kaolinite, halloysite, attapulgipe, montmorillonite, vermiculite, hectorite, etc. Other minerals that can be used include silica, limestone, alumina, etc. Any of the solids can be acidified with an acid to provide neutralization capacity. The excipient also includes a binder and water-sensitive disentegrant. Examples of suitable material haveing the desired binding and disentegrating properties include clays having water-expanding crystal lattices such as bentonite and vermiculite, and water soluble or dispersible gums and polymers such as guar gum, microcrystalline cellulose and pregelatinized starches. A preferred binder and disentegrant is pregelatinized cornstarch which has the property of expansion upon contact with moisture so that the binder will serve, when contacted with moisture, as an expanding disentegrant for the particles. In a preferred embodiment, a distinctive color or dye additive is included in the consolidated particles. Preferably the dye employed is adsorbed on a solid carrier to render it water insoluble, thereby avoiding tracking of the dye by the pet.

19 Claims, No Drawings

FRAGRANT ANIMAL LITTER AND ADDITIVES THEREFOR

BACKGROUND OF THE INVENTION

1. Field of Invention

This invention relates to a pet litter additive and in particular, to an improved pet litter additive having fragrance releasing properties, its method of manufacture, and to a pet litter containing such additive.

2. Brief Description of the Prior Art

One of the more objectionable problems of pet ownership is the handling and disposal of pet wastes. This problem is particularly troublesome when pets are kept in close quarters such as apartments which are frequently inadequately ventilated to remove the objectionable odors released from pet waste such as urine, and decomposition products thereof, e.g. ammonia. Various attempts have been made to obviate this problem by providing pet litters which are formed of highly porous materials having a large specific surface. Such solids can be acidified as described in U.S. Pat. No. 3,059,615 to neutralize the basic ingredients of animal waste. Attempts have been made to incorporate chlorophyll-containing-agents such as alfalfa and the like in the litter as described in U.S. Pat. No. 3,789,797. Other attempts have been made to employ deodorizing pellets such as naphthalene and the like in butlers or drain pans of pet toilets in the manner described in U.S. Pat. Nos. 3,339,527 and 3,334,397.

None of the preceding attempts are entirely successful in elimination of objectionable or obnoxious odors from pet areas. The use of chlorophyll agents such as alfalfa and the like or the use of deodorizing pellets such as naphthalene results in a constant release of the characteristic odor of the additive which, itself, can be objectionable in poorly ventilated or closed areas.

BRIEF STATEMENT OF THE INVENTION

An improved pet litter additive is provided by this invention. The pet litter additive comprises consolidated particles which have the property of fragrance release when contacted with water or moisture. The fragrance released by the particles is a suitable pleasing or desirable plant or earth fragrance, e.g., a pine or a floral fragrance. The particles have the property of regulating the fragrance release responsive to the need for such fragrance.

The particles are consolidated compositions containing a minor quantity of a perfume agent and a major quantity of a solid excipient of molded, finely subdivided or powdered solids including a binder and water-sensitive disentegrant.

The perfume agent is present in minor or trace quantities, as required to achieve a sufficient release of a pleasing fragrance therefrom, typically from about 0.05 to about 5 weight percent. The bulk of the particles comprises the finely subdivided solid excipient which is present therein in an amount from 95 to about 99.95 weight percent and which is consolidated into a molded shape by compression in conventional pharmaceutical tabletting presses or pellet mills. The solid excipient includes a binder for the particles which is present in a minor amount, sufficient to retain the powders as consolidated particles during their storage, handling and use and a water-sensitive disentegrant in an amount sufficient, when the consolidated particles are contacted with water, to disentegrate the particles and release the perfume. Typically, the binder and disentegrant can be the same material and be present in the excipient in an amount from about 1 to about 50 weight percent and in at least one embodiment the entire excipient can be an expanding lattice clay such as bentonite or vermiculite in which case the perfume carrier, binder and disentegrant functions can be satisfied by a single ingredient. The perfume is preferably an agent containing a natural or synthetic plant or earth fragrance, e.g., pine, humus, earth, or a floral fragrance such as a rose, lilac, gardena, etc., essence.

The excipient can include finely subdivided cellulosic solids such as sawdust or chlorophyll-containing solids such as ground alfalfa. Other suitable solids include minerals, typically clay such as kaolinites or montmorilloites. The binder and water-sensitive disentegrant included in the solid excipient can be a water-expanding crystal lattice clay such as bentonite or vermiculite or a water soluble or dispersible gum or polymer such as guar gum, microcrystalline cellulose or pregelatinized starches. These materials have the capability of maintaining the consolidated or molded shape of the particles during normal (dry) handling, storage and use and of disentegrating the particles so that they swell and disentegrate when moistened. Optionally, the particles can contain a suitable dye which, preferably, is a suitable food color (FD and C). The dye becomes adsorbed on the excipient and is thereby rendered water-insoluble. If desired, however, the dye can be adsorbed on alumina or aluminum hydroxide carriers, e.g., the Aluminum Lakes Dyes.

DESCRIPTION OF THE PREFERRED EMBODIMENT

The invention comprises a litter additive suitable for use in admixture with pet litters to provide a litter product useful in the living quarters, cages and the like for pets such as birds, dogs, momkeys, reptiles, cats, etc. The litter product comprises a major quantity of a granulated, absorbent material with a minor amount of the additive, which comprises consolidated particles that are moisture sensitive to release an attractive odor or perfume. Generally, the amount of the consolidated particles which is incorporated in the litter product can be from about 1 to about 35, preferably from 2 to about 20, and most preferably from 5 to about 12, weight percent thereof. The granulated material that is present as the major component of the litter can be formed of cellulosic materials or minerals.

The consolidated particles which are employed as an additive in minor amounts in the litter product and which have the property of fragrance release when contacted with moisture comprise a suitable perfume agent and solid excipient including a binder and a water-sensitive disentegrant. The perfume agent is present in trace to minor quantities in such particles, typically from 0.05 to about 5 weight percent. The solid excipient is present in major quantities and comprises from 9 to about 99.95 weight percent of the consolidated particles. If desired, the consolidated particles can also include a suitable dye which, preferably, is water insoluble to prevent the pet from tracking or carrying the dye to areas outside of the pet area. The dye can be used in an amount sufficient to impart a characteristic color to the particles, e.g., from 0.005 to about 10 weight percent.

The solid material which can comprise the major component of the litter product as well as the finely subdivided solid which is the major and in some instances the sole component of the solid excipient of the consolidated particles can, in general, be any cellulosic or mineral ingredient. Suitable cellulosic materials include fibrous products such as hay, husks, sawdust, cereal hulls, straw, excelsior, corncobs and the like. Suitable minerals include silica, limestone, alumina, alumino-silicates, such as clays, e.g., kaolinite, halloysite, attapulgipe, montomorillonite, vermiculite hectorite, etc. A very suitable material for use as the major component of the litter product as well as for use as the finely subdivided solid of the consolidated particles additive can be a chlorophyll-containing-agent such as grasses, alfalfa and the like.

The material which comprises the bulk, i.e., the major component, of the litter product should be granular or particulate, e.g., particles having size ranges from about 0.1 to about 0.5 inch being preferred. The size range of the particles in the litter product can be achieved by grinding or pulverizing any of the aforementioned solid materials which have sufficient structural integrity to the desired degree of subdivision, e.g., crushed corn cobs and the like. Materials lacking such structural integrity can be ground to a powder and formed into the desired size range of particles by suitable agglomeration techniques such as extruding, pelletizing, or otherwise agglomerating the particles by techniques such as that disclosed in my prior U.S. Pat. No. 3,789,797.

A preferred material for use in the litter product as the majority of the granular material therein, is the porous and expanded product disclosed in copending application Ser. No. 348,053 filed Apr. 5, 1973. This material is prepared by admixing approximately equal weight proportions of a gelatinizable flour and ground alfalfa under steam pressure to gelatinize the flour and cement the particles into a solid form and, then, extruding the product into atmospheric pressure to permit the internal steam pressure to puff the product into a porous, low-density solid. Typically, particles of approximately 0.1 to 0.5, preferably about 3/16 inch, average diameter having a bulk density of from 18 to about 22 pounds per cubic foot can be produced by this method.

The solid material used as the bulk of the litter product as well as the major component of the solid-excipient of the consolidated particles can be teated to provide neutralization capacity for reaction and neutralization of basic materials of urine and its decomposition products. Any suitable acid, such as a mineral acid, e.g., sulfuric, phosphoric, hydrochloric, etc. can be used to acidify the solid. Preferably, however, a buffered acid such as an alkali metal, e.g., sodium, postassium, etc., partial salt of a polybasic acid is employed to provide a sufficient neutralization capacity without markedly decreasing the pH of the material below about 2.0. Other acids that can be used for this purpose include citric acid, acetic acid, oxalic acid, benzoic acid, etc. Typically the amount of acid that can be employed for this purpose is sufficient to provide a neutralization capacity to the litter product of about 2 and the amounts of acid so employed can comprise from about 0.1 to about 5 weight percent of the solid material.

The perfume containing agent which is incorporated in the consolidated granules can, be a perfume of any pleasing fragrance and can be the oils or extracts of various plant essences such as floral essences, e.g., essences of rose, lilac, gardena, jasmine, citrus blossoms such as orange, peach, etc. or an oil or extract of conifers such as pine, juniper and the like. Another suitable perfume agent can be one having the essence of humus or other earth fragrances, e.g., In-Cap Fresh Earth, IC57-41 available from Polak's Frutal Works, Inc., Middletown, N.Y. The perfume can be employed in any suitable form, however, water soluble perfumes which contain a suitable co-solvent or emulsifying agent are preferred.

The solid excipient also includes a binder and disentegrant. The binder maintains the consolidated granules in a firm and compacted condition during normal, or dry, handling and use thereof while the disentegrant is water-sensitive to disentegrate the particles when they are moistened by water, urine and the like. Typically, both of these functions are served by a single component such as a water soluble or dispersible gum or polymer, e.g., guar gum, microcrystalline cellulose or a pregelatinized starch. In another embodiment, all the functions of the solid excipient, i.e., solid carrier, binder and disentegrant can be furnished by a single component such as an expanding lattice clay, e.g., bentonite or vermiculite. The preferred binder and disentegrant is a pregelatinized corn starch which is commercially available from various suppliers such as National Starch Company. The pregelatinized starches are preferred because they do not impart a sticky quality or any adhesiveness to the powder residue after disentegration of the particles, thereby insuring that the powder residue remains in the litter and doesn't adhere to the pet. When the solid excipient includes a separate component to serve as the binder and disentegrant, such component can be present in an amount from 1 to about 50 weight percent, preferably from 10 to about 35 weight percent of the solid excipient.

It is also desirable and preferred to incorporate a suitable dye in the consolidated particles in a quantity from 0.005 to about 10 weight percent, sufficient to impart a distinct coloration thereto. This not only imparts a distinctiveness to the product but also serves to indicate the reserve of deodorizing capacity of the litter. When the consolidated granules are distinctly colored, one can readily determine the reserve of deodorizing capacity by observing the number of colored consolidated particles in the litter. Suitable coloring agents include any of the well known F D & C food colors which are available in the primary colors of red, yellow and blue as well as intermediate shades thereof. These materials can be employed in the form of Aluminum Lakes Dyes which comprise the food dye adsorbed on an inert carrier such as aluminum oxide or hydroxide.

The manufacture of the litter product of the invention is achieved by physically admixing the consolidated particles in the aforeindicated minor amount with the major proportions of any of the aforementioned granulated solid materials. Any conventional solids mixing equipment can be used and the litter product can thereafter be stored and handled in bulk quantities or can be packaged using conventional boxing or bagging techniques. One useful package is a disposable litter tray made of plastic or wax coated corrugated cardboard with a tearoff lid in which is placed the litter, preferably in a water resistant plastic container, e.g., in a polyethylene bag.

The consolidated particles, which have the property of releasing a pleasing fragrance upon contact by moisture, are preferably formed by blending the various dry ingredients employed in a formulation using conventional solid mixing equipment and adequate time, e.g., from 5 to 30, preferably from 5 to 15, minutes to achieve intimate admixture of the solid ingredients. The dry ingredients include the dye, when employed, and the components of the solid excipient which are used to furnish the carrier, binder and disentegrant functions. When water soluble or dispersible binder-disentegrants are employed, it is preferred to add water to the admixed solids in an amount sufficient to wet the solids and form a paste or slurry. Generally, the amount of water so employed can comprise from 15 to about 65 weight percent of the blended dry components of the mixture. The resultant mixture is thoroughly stirred to blend the water into the dry mixture of powdered ingredients resulting in the formation of a paste to dough-like product. This blending is continued for a period from 5 to about 30, preferably from 5 to about 15, minutes, to thoroughly disperse the binder and color as a coating on the solid carrier particles. The mixture is then dried sufficiently to permit its molding into particles, typically from about 5 to 15 and, preferably about 10 weight percent moisture to permit its molding into the desired, consolidated particles.

The dried mixture can then be milled or comminuted to break up any agglomerates that may have formed during the preceding steps and to again provide a powdered solid having a sufficient fineness to pass a 10 and, preferably, a 20 mesh standard size screen. The fragrance or perfume agent is then added to the powdered solids in the aforeindicated amount and blended therein by mixing the solid for an adequate period, e.g., from 1 to about 10 minutes. The resultant powders can then be molded into the desired particle size and shape using any conventional technique, e.g., the mixture can be extruded having a suitable size range, e.g., from about 1/16 to about ½ inch in diameter. The extruded product is, as in conventional manufacture, chopped into short lengths by a rotating knife mechanism that chops the extruded product as it is forced from the dye of the extruding apparatus. Typically, the product can be chopped into short length of from about 1/16 to about ½ inch.

Other molding techniques can be used such as a conventional pelletizing machine which forms pellets having diameters from about ⅛ to about ½ inch in diameter and thicknesses from about 0.1 to about 0.3 inch or conventional rotary tabletting presses such as used in the pharmaceutical industry. Suitable molding pressures are from 5 to about 500, preferably from about 15 to about 150 psi. The molding operation is preferably performed at ambient temperatures, although, temperatures up to about 175°–200° F. can be used, if desired.

The exemplified compositions in the following examples will illustrate suitable blends of ingredients for formation of the consolidated granules of the invention. All concentrations expressed therein are on a moisture-free weight basis.

EXAMPLE 1

| Component | Function | Concentration |
| --- | --- | --- |
| 1. Candle Essence Cashmere SFC 534K | Perfume Agent | 2% |
| 2. Sawdust | Excipient-carrier | 35% |
| 3. Alfalfa | Excipient-carrier | 35% |
| 4. Starch-National 1551 | Excipient-binder/ disentegrant | 28% |

EXAMPLE 2

| Component | Function | Concentration |
| --- | --- | --- |
| 1. Lilac essence, Scientific Flavor SFL304KWS | Perfume agent | 1% |
| 2. Sawdust | Excipient-carrier | 71% |
| 3. Starch-National 1551 | Excipient-binder/ disentegrant | 28% |
| 4. F D and C Red No. 3 | Dye | 0.05% |
| 5. F D and C Blue No. 1 | Dye | 0.05% |

EXAMPLE 3

| Component | Function | Concentration |
| --- | --- | --- |
| 1. Pine fragrance | Perfume agent | 1.0% |
| 2. Sawdust | Excipient-carrier | 70.5% |
| 3. Starch-National 1551 | Excipient-carrier | 26.4% |
| 4. Titanium dioxide | Dye - whitener | 2.0% |
| 5. Lime Color, Warner Jenkinson No. 6508 | Dye | 0.1% |

EXAMPLE 4

| Component | Function | Concentration |
| --- | --- | --- |
| 1. Earth fragrance In-Cap IC57-41 | Perfume agent | 0.5% |
| 2. Ceral hulls | Excipient carrier | 30% |
| 3. Silica | Excipient carrier | 30% |
| 4. Montmorillonite | Excipient binder/ disentegrant | 39.5% |

EXAMPLE 5

| Component | Function | Concentration |
| --- | --- | --- |
| 1. Pine fragrance | Perfume agent | 1.0% |
| 2. Vermiculite | Excipient | 99.0% |

EXAMPLE 6

| Component | Function | Concentration |
| --- | --- | --- |
| 1. Lilac essence | Perfume agent | 1% |
| 2. Sawdust | Excipient-carrier | 69% |
| 3. Guar gum | Excipient-binder/ disentegrant | 30% |
| 4. F D and C Red No. 3 | Dye | 0.05% |
| 5. F D and C Blue No. 1 | Dye | 0.05% |

The following will illustrate the preparation of a suitable cat litter product.

EXAMPLE 7

Consolidated particles are prepared of the composition of Example 1 by admixing 14 weight parts of sawdust, 14 weight parts of alfalfa and 11.3 weight parts of a pregelatinized corn starch, product 1551 of the National Starch and Chemical Corporation. The sawdust and alfalfa employed are finally subdivided, having their particles passing a ten mesh standard size screen. The starch product is finally subdivided to a flour consistency, typically passing about 100 mesh standard screen.

The solid ingredients are thoroughly admixed using a conventional solids blending apparatus. There is then added to the mixture of dry solids, 0.87 weight parts of the perfume, candle essence, product Casmere SSC-534-K, and 59.83 weight parts of water. The water is slowly added with stirring of the dry ingredients to blend the water and the perfume thoroughout the blend.

The resulting blend is paste-like in consistency and is dried to approximately 10 weight percent moisture content in a suitable drying apparatus such as a rotating drum dryer. The dried and blended ingredients are then molded into the desired shape using a conventional tabletting press which produces pellets of approximately ⅜ inch diameter and a thickness of about 3/16 inch.

EXAMPLE 8

Consolidated particles are prepared of the composition set forth in Examples 2 and 3 by the following procedure The sawdust, starch and dye components are milled to a fine particle size, sufficient to pass a Number 20 standard size screen and the resultant powders are dry blended using a conventional dry solids mixer. Water at concentrations of 49.9 and 48.3 percent was added to the compositions of Examples 2 and 3, respectively, and the resultant pastes are blended for 10 minutes. The materials are then placed on trays of an oven and dried therein at 110° F. for about 8 hours, until a moisture content of 10 weight percent is reached.

The dried solids are milled in a conventional solids mill to break up any agglomerates and reduce the particles to a size range passing a Number 20 standard size screen. The perfume agents are then added at the indicated concentrations and the resultant mixtures are blended for a period of about 5 minutes to disperse the perfume thoroughly throughout the solids. The perfumed powders are then pelletized using a conventional rotary tabletting press to produce particles having diameters of about ⅜ inch and a thickness of about 3/16 inch.

The consolidated pellets prepared in the preceding manner are then blended with a porous expanded litter product in weight proportions of 10 parts of consolidated pellets to 90 parts of the expanded litter granules. The litter granules used are a highly porous, expanded product having a bulk density of about 20 pounds per cubic foot which are prepared by admixing approximately equal weight parts of a gelatinizable wheat flour and ground alfalfa, molded under steam pressure in an extruding apparatus and extruded therefrom through a 3/16 inch diameter dye into the atmosphere to form a porous extrudate which was chopped into lengths of approximately 3/16 inch dimension.

When the consolidated particles are contracted with moisture, the particles immediately swell and disintegrate into a loose mound of expanded powdered solid within a period of approximately 10 seconds and the perfume of the solids then releases a fragrance.

The invention has been described by reference to a particularly illustrated and preferred mode of practice thereof. It is not intended that this illustration be unduly limiting of the invention. Instead, it is intended that the invention be defined by the materials and their obvious equivalents set forth in the following claims.

What is claimed is:

1. A moisture sensitive fragrance releasing solid which comprises consolidated particles of:
    a perfume; and
    a solid excipient of powdered solids having a particle size passing about a 10 mesh standard size sieve molded into consolidated particles having a size ranging from about 1/16 to about ½ inch diameter and including a binder and water sensitive disintegrant in an amount sufficient to retain the particles in a molded shape during handling, storage and use thereof and sufficient, when contacted with water, to disintegrate said particles into a powder state and release said perfume.

2. The litter solid of claim 1 wherein said binder and water sensitive disintegrant is a pregelatinized starch and said excipient includes a finely subdivided cellulosic material.

3. The solid claim 2 wherein said cellulosic material is sawdust.

4. The solid of claim 2 wherein said cellulosic material is acidified with a sufficient quantity of an acid to provide a neutralization capacity thereto of at least about 2 and a pH of approximately 2.0.

5. The solid of claim 1 wherein said excipient includes a mixture of finely ground alfalfa and sawdust.

6. The solid of claim 1 wherein said binder and water-sensitive disentegrant is a pregalatinized starch.

7. The solid of claim 6 wherein said pregelatinized starch is corn starch.

8. The solid of claim 7 which also includes from 0.005 to about 10 weight percent of a dye.

9. The solid of claim 8 wherein said dye is present in admixture with finely subdivided aluminum oxide to render said dye water insoluble.

10. The mixture of the fragrance releasing solid of claim 6 in admixture with inert litter granules in proportions of from 1 to 35 parts of said fragrance releasing solids with from 99 to 65 weight parts of said inert litter granules.

11. The solid of claim 10 wherein said inert litter granules comprise an expanded porous product of flour and alfalfa having a bulk density from 18 to about 22 pounds per cubic foot.

12. The litter product of claim 10 wherein said litter granules comprises alfalfa.

13. The solid of claim 1 wherein said binder and water sensitive disintegrant is guar gum, microcrystalline cellulose or pregelatinized starch.

14. The solid of claim 7 wherein said perfume is present in an amount from 0.05 to 5 weight percent of said particles.

15. The solid of claim 14 wherein said perfume is a floral essence.

16. The solid of claim 14 wherein said perfume is an essence of humus.

17. The solid of claim 7 wherein said particles are extruded particles.

18. The solid of claim 7 wherein said particles are pellets having a size range from about ⅛ to about ½ inch diameter.

19. The mixture of the fragrance releasing solid of claim 6 in admixture with inert litter granules in proportions of from 2 to 20 parts of said fragrance releasing solids with from 98 to 80 weight parts of said inert litter granules.

* * * * *

UNITED STATES PATENT OFFICE
CERTIFICATE OF CORRECTION

Patent No. 3,921,581   Dated 11/25/75

Inventor(s)   Andrew I. Brewer

It is certified that error appears in the above-identified patent and that said Letters Patent are hereby corrected as shown below:

In the Specification, Column 2, line 58, after the word "from" change "9" to --95--.

Signed and Sealed this twenty-third Day of March 1976

[SEAL]

Attest:

RUTH C. MASON
*Attesting Officer*

C. MARSHALL DANN
*Commissioner of Patents and Trademarks*